Patented Feb. 16, 1954

2,669,530

UNITED STATES PATENT OFFICE 2,669,530

PREPARATION OF BETA-DEXTROSE BY MELTING AND CRYSTALLIZING

Francis E. Kite, Riverside, Ill., assignor to Corn Products Refining Company, New York, N. Y., a corporation of New Jersey No Drawing. Application September 22, 1951, Serial No. 247,902

6 Claims. (Cl. 127—60)

This invention relates to the production of beta dextrose.

The usual procedures for obtaining crystalline dextrose produce either anhydrous or hydrated alpha dextrose. Both of these forms of the alpha isomer of dextrose exhibit a relatively slow rate of solution, which is a distinct disadvantage in many commercial applications. Beta dextrose, however, dissolves much more rapidly than the alpha isomer and hence would be much more satisfactory for many commercial uses.

Methods of obtaining beta dextrose are known, but, in general, these involve crystallization from water and present several disadvantages, such as difficulty in removing the last traces of moisture without impairing the quality of the product. If these last traces of moisture are allowed to remain, the product is unstable under normal conditions and gradually reverts to the alpha form. A further disadvantage of these methods is that the product is obtained in a finely powdered, excessively dusty form. Also, yields usually are rather low. Consequently, a method for producing beta dextrose or a product rich in the beta isomer without the disadvantages of prior processes would be a distinct improvement.

It is an object of this invention to provide a process for the production of beta dextrose, or a product rich in the beta isomer, with no loss of dextrose. It is a further object to provide a method for producing beta dextrose or a product rich in the beta isomer without necessity for crystallization from water. Another object is to provide a process for obtaining beta dextrose of sufficiently low moisture content to remain stable under ordinary atmospheric or packaging conditions. Still another object is to provide a process for the production of beta dextrose whereby the product may be obtained in a relatively non-dusting form. Other objects and advantages will appear hereinafter.

The present invention relates to a process for producing beta dextrose, or a product rich in beta dextrose, which comprises fusing alpha anhydrous dextrose and crystallizing beta dextrose from the melt. More specifically, alpha anhydrous dextrose is heated very rapidly until melted. The melting point of alpha anhydrous dextrose is about 146° C., and, therefore, the mass of crystalline alpha anhydrous dextrose should be heated at least to this temperature. Higher temperatures or prolonged heating after fusion have no effect on beta dextrose content of the product. However, prolonged heating, particularly at higher temperature, promotes decomposition and caramelization of the dextrose, and, therefore, it is preferable to heat the dextrose just sufficiently to melt the same and complete the fusion as rapidly as possible.

When the fusion is complete, the mass is allowed to cool to a temperature slightly below the melting point, where it is advantageously seeded with beta dextrose crystals while still in the liquid state. Seeding should, in general, be accomplished at a temperature close to the melting point. Temperatures within the range of about 130° C. to about 140° C. are preferred. However, the temperature at which the seeding is accomplished is not critical, but as the melt cools, it becomes progressively more viscous, making it difficult to mix in the seed crystals.

Either alpha or beta dextrose may be employed as seed, or seeding may be omitted entirely, and the supercooled melt allowed to crystallize spontaneously, without adversely affecting the beta dextrose content of the product. However, crystallization is slower if the melt has not been seeded, and some discoloration of the product, due to prolonged holding at elevated temperature, may occur. Hence, seeding is preferable, although not absolutely essential.

Since the seeding per se is optional, it is obvious that the amount of seed crystal employed, when operating according to our preferred procedure, is not critical. Amounts within the range of about 1 to about 5 per cent by weight have been found satisfactory; however, lesser or greater percentages may also be used.

After seeding is accomplished or, in the event seed crystals are not to be added, immediately upon completion of the fusion, the molten mass is cooled to an intermediate temperature, preferably within the range of about 70° C. to about 100° C., and allowed to crystallize. The time required for completion of the crystallization varies, depending upon the holding temperature. Within the aforesaid temperature range, about one-half to 5 hours will usually be required for complete crystallization.

The above preferred range for the temperature of crystallization is not critical, and higher or lower temperatures may be employed, if desired. However, higher temperatures will again, of course, tend to promote discoloration of the product, while lower temperatures result in an increase in the length of time required for complete crystallization. For example, at room temperature, about 48 hours are required for completion of the crystallization. Moreover, at room temperature, it was found that limited amounts of atmospheric moisture were needed to induce crystallization, but an excessively humid atmosphere caused moisture pickup in the product. Also, in products crystallized at room temperature, the beta dextrose content, while still substantial, was not as high as in the product crystallized within the preferred range.

Another alternative in crystallizing procedure is to cool the melt to room temperature after seeding has been accomplished, or immediately upon completion of the fusion if the melt is not to be seeded, and subsequently reheat to the preferred crystallization temperature range. However, crystallization is somewhat slower than when the melt is cooled only to the preferred crystallization temperature range.

No dry substance is lost by this process, dextrose recovery being 100 per cent. The product will usually contain approximately 65 to approximately 85 per cent beta dextrose, depending upon operating conditions. It generally has a moisture content of less than 0.1 per cent, which is sufficiently low for the content of beta isomer remains stable indefinitely under average atmospheric or packaging conditions.

The product consists of aggregates of minute crystals the majority of which are beta dextrose. These aggregates are coherent and strong enough to resist attrition. Other methods of preparing anhydrous, stable products in practically quantitative yield give porous friable masses which are bulky and very dusty when transferred from containers.

On a small scale the foregoing procedure can be carried out by heating the sugar on a plate of heat resisting steel, preferably in the form of an open dish or pan. The plate is brought to the desired temperature by a controlled heater such as an electric hot plate. A quantity of crystalline anhydrous alpha dextrose is poured onto the plate and stirred to facilitate heat transfer until it is completely melted. The melt is allowed to cool to 130–135° C. and a small quantity of seed crystals is added with stirring. The mixture is scraped out into a smaller vessel and placed in an oven at 70–100° C. When crystallization is complete, the mass is cooled to room temperature. The final product is in the form of a hard, solid block. If the proper conditions of temperature and time have been used, the product is practically colorless.

On a larger scale means should be provided for continuously melting and seeding the sugar, allowing to crystallize and removing the product. This could be accomplished, for example, on a metal belt which passes continuously through heating zones of the required temperatures. Alpha dextrose could be poured onto the belt, seeded after melting, allowed to crystallize in an intermediate temperature zone and finally recovered by causing the cool end of the belt to pass over a roller whereby the brittle mass would break off and be caught in a suitable container.

The sugar could also be melted by extruding through a heated tube. Temperature and feed rate could be controlled to leave some of the sugar unmelted. The added step of incorporating seed crystals is thus avoided. The extruded mixture is then passed by a suitable conveyor through a zone at intermediate temperature until crystallization is complete.

The following examples, which are intended as informative and typical only and not in a limiting sense, will further illustrate the invention:

Example 1

A stainless steel pan, 8½ inches in diameter was heated to a surface temperature of about 180° C. on an electric hot plate. One hundred and fifty grams of anhydrous alpha dextrose was poured into the pan and stirred with a spatula. Owing to heat of fusion the temperature dropped during this period. After 5 minutes the mass had fused to a clear, colorless fluid. Temperature was found to be 160° C. by measuring with a thermocouple immersed in the molten mass. The pan was removed from the source of heat, the contents allowed to cool to 135° C. and 5 per cent by weight of a previously made batch containing 75 per cent beta dextrose was added with stirring. The seeded viscous melt was transferred to a porcelain dish and placed in an air oven maintained at 100° C. After one-half hour the mass was completely crystallized. The product weighed 150 grams, and contained 82 per cent beta dextrose and 0.07 per cent moisture.

Example 2

Anhydrous dextrose was treated by exactly the same procedure as described in the foregoing example except that 2 per cent anhydrous alpha dextrose was used to seed the molten mass. After one-half hour at 100° C. the mass had crystallized to give a product containing 79 per cent beta dextrose.

Example 3

Anhydrous dextrose was melted by the method of Example 1, seeded with 2.5 per cent of a previous batch of beta dextrose and then held at 75° C. After 5½ hours the crystalline product contained 83 per cent beta dextrose and 0.03 per cent moisture.

Example 4

Anhydrous dextrose was melted and seeded as in Example 1 with 5 per cent of product from a previous batch. The molten mass was held at 60° C. for 17 hours. Crystalline product contained 69 per cent beta dextrose and 0.04 per cent moisture.

Example 5

Anhydrous dextrose was melted as in Example 1 and cooled directly to room temperature, without addition of seed crystals. A glassy solid was obtained which, after removal from the pan, was broken into pieces ⅛ to ¼ inch thick. At this point the solid was sticky and somewhat difficult to handle. After several hours crystallization could be seen beginning at the surface of the fragments and progressing inward. Progress of the crystallization proved to be dependent on atmospheric moisture. At high humidity crystallization was complete in about 100 hours. In dry air crystallization was exceedingly slow. Absorption of moisture at high humidity occurs with loss of beta dextrose and the desirable property of dissolving rapidly in water. A final product after exposure to air of 50 per cent humidity for 142 hours contained 55 per cent beta dextrose and 0.10 per cent moisture.

It is readily apparent that crystallization at elevated temperature is to be preferred in order to obtain low moisture, stable product of high beta dextrose content without excessive time of treatment. Nevertheless the foregoing example is given to show that the procedure is not necessarily limited to the preferred range of conditions.

I claim:

1. Process for the production of beta dextrose, comprising rapidly heating crystalline alpha anhydrous dextrose until completely fused to form a melt; cooling the melt to a temperature within the range of about 130° C. to about 140° C. without inducing crystallization and seeding the liquid melt with crystalline dextrose at said temperature; further cooling said melt to a temperature within the range of about 70° C. to about 100° C., and maintaining the same at a temperature within this range until crystallization is complete.

2. Process for the production of a product rich in beta dextrose, comprising rapidly heating alpha anhydrous dextrose until completely fused to form a melt; cooling the melt to approximately 135° C., seeding said melt at said temperature with dextrose crystals containing a substantial percentage of the beta isomer; further cooling said melt to a temperature within the range of about 70° C. to about 100° C., and allowing said melt to crystallize at a temperature within the aforesaid range.

3. The process of claim 1, wherein beta dextrose is employed as seed.

4. The process of claim 1, wherein alpha dextrose is employed as seed.

5. The process of claim 1, wherein the dextrose crystals employed as seed comprises a mixture of alpha and beta dextrose.

6. The process of claim 1, wherein the amount of seed crystals employed is from about 1 to about 5 per cent by weight of the fused dextrose.

FRANCIS E. KITE.

References Cited in the file of this patent

UNITED STATES PATENTS

| Number | Name | Date |
| --- | --- | --- |
| 1,686,703 | Leo | Oct. 9, 1928 |

OTHER REFERENCES

Advances in Carbohydrate Chemistry, volume 5, New York, 1950, pages 136 and 137.

Mackenzie, Sugars and their Simple Derivatives, London 1913, page 69.